United States Patent Office 2,813,866
Patented Nov. 19, 1957

2,813,866

8-R-1,6,8-TRIAZABICYCLO(4,3,0)-3-NONENE-7,9-DIONES AND PREPARATION THEREOF

Robert L. Clarke, Elsmere, N. Y., assignor to Sterling Drug Inc., New York, N. Y., a corporation of Delaware No Drawing. Application June 10, 1955,
Serial No. 514,686

20 Claims. (Cl. 260—250)

This invention relates to 8-R-1,6,8-triazabicyclo[4,3,0]-3-nonene-7,9-diones wherein R is hydrogen, an alkali metal, or the residue of an alkylating agent having a molecular weight less than about 300, and to processes for preparing them. A preferred aspect of the invention relates to compounds having the formula

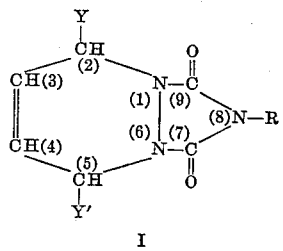

I wherein R is hydrogen, an alkali metal, or the residue of an alkylating agent having a molecular weight less than about 300, and Y and Y' are hydrogen or lower-alkyl groups.

The compounds of the invention are useful as starting materials in the synthesis of mercury derivatives. Pharmacological evaluation of these mercury derivatives has shown that they possess diuretic activity when administered to dogs at non-toxic and non-irritating dose levels, thus indicating their usefulness in relieving edematous conditions and in treatment of certain types of nephritis and heart disease wherein increased elimination of fluid and of sodium ion is desirable. The compound of Formula I wherein R is hydrogen or an alkali metal has been found to possess diuretic activity per se, and also the compound of Formula I wherein R is carboxymethyl.

The group R in the above general Formula I represents hydrogen, an alkali metal, or the residue of an alkylating agent RX wherein X is a negative radical derived from a strong acid. The nature of the group R is not critical provided it is of relatively low molecular weight, less than about 300. Illustrative of the group R, when it represents the residue of an alkylating agent, are alkyl groups, cycloalkyl groups, cycloalkylalkyl groups, and monocarbocyclic aryl-lower-alkyl groups, and such groups substituted by from one to three hydroxy, carboxy or carboalkoxy groups. The group R preferably has less than about 15 carbon atoms. Thus R can be such groups as methyl, ethyl, propyl, isopropyl, butyl, isobutyl, pentyl, hexyl, octyl, decyl, dodecyl, pentadecyl, cyclopropyl, cyclobutyl, cyclopentyl, cyclohexyl, 4-methylcyclohexyl, cycloheptyl, cyclopentylmethyl, 2-cyclohexylethyl, 4-methylcyclohexylethyl, benzyl, 2-phenylethyl, 5-phenylpentyl, carboxymethyl, carbethoxymethyl 2-hydroxyethyl, 2,3-dihydroxypropyl, 2-hydroxy-3-carboxypropyl, tris(hydroxymethy)methyl, and the like. The aryl groups of the monocarbocyclic aryl-lower-alkyl groups can also contain other substituents inert under the conditions of the preparation of the compounds, viz. nitro, halogen, alkyl, alkoxy, trifluoromethyl, and the like.

Illustrative of the compounds of Formula I are the following: 1,6,8 - triazabicyclo[4,3,0] - 3 - nonene - 7,9-dione; 2,5 - dimethyl - 1,6,8 - triazabicyclo[4,3,0] - 3-nonene - 7,9 - dione; 2,5 - dipropyl - 1,6,8 - triazabicyclo[4,3,0] - 3 - nonene - 7,9 - dione; 8 - methyl - 1,6,8 - triazabicyclo[4,3,0] - 3 - nonene - 7,9 - dione; 2,5,8 - trimethyl - 1,6,8 - triazabicyclo[4,3,0] - 3 - nonene - 7,9-dione; 8 - cyclopentyl - 1,6,8 - triazabicyclo[4,3,0] - 3-nonene - 7,9 - dione; 8 - cyclohexylmethyl - 1,6,8 - triazabicyclo[4,3,0] - 3 - nonene - 7,9 - dione; 8 - benzyl-1,6,8 - triazabicyclo[4,3,0] - 3 - nonene - 7,9 - dione; 8 - (2 - phenylethyl) - 1,6,8 - triazabicyclo[4,3,0] - 3-nonene - 7,9 - dione; 8 - (p - chlorobenzyl) - 1,6,8 - triazabicyclo[4,3,0] - 3 - nonene - 7,9 - dione; 8 - carboxymethyl - 1,6,8 - triazabicyclo[4,3,0] - 3 - nonene - 7,9-dione; 8 - (m - methoxybenzyl) - 1,6,8 - triazabicyclo[4,3,0] - 3 - nonene - 7,9 - dione; 8 - (2,3 - dihydroxypropyl) - 1,6,8 - triazabicyclo[4,3,0] - 3 - nonene - 7,9-dione; 8 - (1,2 - dicarboxyethyl) - 1,6,8 - triazabicyclo[4,3,0] - 3 - nonene - 7,9 - dione; 8 - (2 - carbomethoxyethyl) - 1,6,8 - triazabicyclo[4,3,0] - 3 - nonene - 7,9-dione, and the like.

A preferred class of the group R comprises hydrogen, alkali metals, lower-alkyl groups, and lower-alkyl groups substituted by from 1 to 3 hydroxy, carboxy or carbolower-alkoxy groups. The lower-alkyl groups can be straight or branched and contain from 1 to about 6 carbon atoms. Thus the preferred class of the group R includes such groups as methyl, ethyl, propyl, isopropyl, butyl, isobutyl, pentyl, hexyl, isohexyl, carboxymethyl, carbethoxymethyl, 2 - hydroxyethyl, 2,3 - dihydroxypropyl, 2 - hydroxy - 3 - carboxypropyl, tris(hydroxymethyl)methyl, and the like.

In the above general Formula I, the groups Y and Y' represent hydrogen atoms or lower-alkyl groups. The groups Y and Y' can be the same or different, although it is preferred that they be the same in order to prevent the formation of mixtures upon mercuration of the unsaturated intermediates of Formula II below. When Y and/or Y' are lower-alkyl groups they can be straight or branched and have from one to about four carbon atoms, thus including such groups as methyl, ethyl, propyl, isopropyl, butyl, isobutyl and tertiary-butyl.

The compounds of Formula I are prepared according to the following equations:

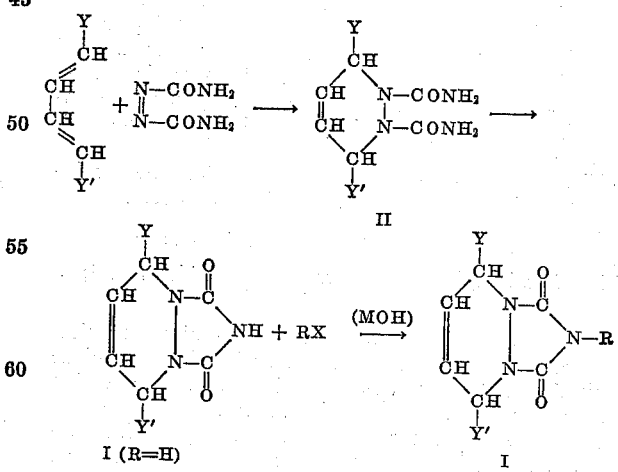

An alkadiene having conjugated double bonds is reacted with azodicarboxamide to give a 1,2-dicarbamyl-1,2,3,6-tetrahydropyridazine (II). Among the alkadienes which can be employed are 1,3-butadiene, 1,3-pentadiene, 2,4-hexadiene, 3,5-octadiene, 2,7-dimethyl-3,5-octadiene, 5,7-dodecadiene, and the like. Pyrolysis of the compound of Formula II gives a compound of Formula I (R=H). The imido hydrogen is acidic in character and the compound I (R=H) is soluble in alkali metal hydroxides, MOH, to give a salt of Formula I wherein R is an alkali metal. Preferred salts are the sodium and potassium salts. The said alkali metal salts can then be alkylated with an alkylating agent, RX, wherein X is the anion of a strong acid such as chloride, bromide, iodide, sulfate, and the like.

The 1,2 - dicarbamyl - 1,2,3,6 - tetrahydropyridazines of Formula II are disclosed and claimed in the copending application of W. T. Hunter, Serial No. 514,688, filed June 10, 1955.

The pyrolysis of a 1,2 - dicarbamyl - 1,2,3,6 - tetrahydropyridazine (II) is carried out by heating the substance above its melting point (250° C.), and preferably below about 300° C. until evolution of ammonia gas has ceased (about thirty minutes).

The reaction of an alkali metal salt of a compound of the invention wherein R is hydrogen with an alkylating agent, RX, to give an N-substituted derivative is carried out either in aqueous medium or in an organic solvent inert under the conditions of the reaction. The reaction mixture is preferably heated at a temperature between about 50° C. and 150° C. to complete the reaction.

The mercury derivatives prepared from the compounds of the present invention have the formula

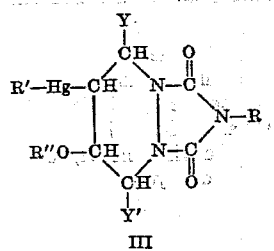

III wherein R, Y and Y' have the meanings given above, R' is an anion, and R'' is hydrogen or a lower-alkyl, hydroxy-lower-alkyl, lower-alkoxy-lower-alkyl, or a hydroxy - lower - alkoxy - lower - alkyl group. These compounds are claimed in the copending application of R. L. Clarke and F. W. Gubitz, Serial No. 514,687, filed June 10, 1955.

The mercury compounds of Formula III are prepared by reacting a compound of Formula I with a mercuric salt in the presence of water or an alcohol. In the compounds of Formula III thus produced, the group R' is the anion derived from the mercuric salt used, and the group R'' is derived from the solvent used, being hydrogen if water is used or an aliphatic group if an alcohol is used. A preferred mercuric salt is mercuric acetate and a preferred solvent is methanol, thus giving the compounds of Formula III wherein R' is acetoxy and R'' is methyl.

The following examples will further illustrate the invention, without the latter being limited thereto.

PREPARATION OF INTERMEDIATES

*1,2 - dicarbamyl - 1,2,3,6 - tetrahydropyridazine* [II; Y and Y'=H]

A mixture of 312 g. (2.7 moles) of azodicarboxamide, 750 ml. of dimethylformamide, and 650 ml. of butadiene (mixed in that order) was heated in an autoclave at 100° C. for four hours. The reaction mixture was cooled and the mixture rinsed from the autoclave liner with benzene. The solid product was collected by filtration, washed with n-pentane, and air dried, giving 346 g. of 1,2 - dicarbamyl - 1,2,3,6 - tetrahydropyridazine. A sample when recrystallized twice from water had the M. P. 253–255.5° C.

*Analysis.*—Calcd. for $C_6H_{10}N_4O_2$: N, 32.92; O, 18.80. Found: N, 32.84; O, 19.20.

Other pyridazines can be produced by repeating the above preparation, observing the same conditions for conducting the process, by substituting a molar equivalent amount of a $C_5$ to $C_{12}$ alkadiene for the butadiene therein used. Thus, 1,2 - dicarbamyl - 3,6 - dimethyl-1,2,3,6 - tetrahydropyridazine can be obtained with 2,4-hexadiene, by way of illustration.

EXAMPLE 1

*1,6,8 - triazabicyclo[4,3,0] - 3 - nonene - 7,9 - dione* [I; R=H, Y and Y'=H]

1,2 - dicarbamyl - 1,2,3,6 - tetrahydropyridazine (200 g., 1.19 moles) was heated at 275–285° C. for about thirty minutes. The solid melted with evolution of ammonia in the time specified and evolution of gas substantially ceased. The product was cooled, dissolved in a solution of 47 g. of sodium hydroxide in 500 ml. of water, treated briefly with 10 g. of activated charcoal (Darco G–60) at 50° C., cooled and filtered. The filtrate was acidified with 100 ml. of concentrated hydrochloric acid, the product which separated was collected by filtration and dried, giving 154 g. of 1,6,8-triazabicyclo[4,3,0]-3 - nonene - 7,9 - dione. Two recrystallizations from water gave a sample of the compound in the form of colorless needles, M. P. 244–247° C. (corr.).

*Analysis.*—Calcd. for $C_6H_7N_3O_2$: N, 27.45; O, 20.9. Found: N, 27.35; O, 21.1.

Neut. equiv. calcd.: 153.1. Found: 152.9.

1,6,8 - triazabicyclo[4,3,0] - 3 - nonene - 7,9 - dione was found to possess diuretic activity approximately equal to that of theophylline when administered to dogs at dose levels of 7.5–30.0 mg./kg. of body weight. No toxic manifestations were observed at any dose level.

By replacement in the above procedure of the 1,2-dicarbamyl - 1,2,3,6 - tetrahydropyridazine by a molar equivalent amount of 1,2 - dicarbamyl - 3,6 - dimethyl-1,2,3,6 - tetrahydropyridazine, there can be obtained 2,5 - dimethyl - 1,6,8 - triazabicyclo[4,3,0] - 3 - nonene-7,9-dione [I; R=H, Y and Y'=CH$_3$].

The utility of 1,6,8 - triazabicyclo[4,3,0]-3-nonene-7,9-dione as an intermediate is illustrated by the following preparations:

(a) *3 - acetoxymercuri - 4 - methoxy - 1,6,8 - triazabicyclo[4,3,0] - nonane - 7,9 - dione* [III; R=H, R'=CH$_3$COO, R''=CH$_3$, Y and Y'=H]

To a solution of 6.3 g. (0.041 mole) of 1,6,8-triazabicyclo[4,3,0] - 3 - nonene - 7,9 - dione dissolved in 150 ml. of boiling methanol was added a filtered solution of mercuric acetate (13.1 g., 0.041 mole) in 50 ml. of boiling methanol. To the resulting mixture was added three drops of concentrated nitric acid, and the mixture was refluxed and stirred for two hours. The reaction mixture was cooled in ice, and the solid product which had separated was collected by filtration and washed several times by decantation with warm water to remove unreacted starting materials. The product was then triturated with absolute alcohol followed by absolute ether, giving 3 - acetoxymercuri - 4 - methoxy-1,6,8 - triazabicyclo[4,3,0]nonane - 7,9 - dione in the form of an amorphous solid.

By replacing in the preparation just described the 1,6,8 - triazabicyclo[4,3,0] - 3 - nonene - 7,9 - dione by a molar equivalent amount of 2,5 - dimethyl - 1,6,8-triazabicyclo[4,3,0] - 3 - nonene - 7,9 - dione, there can be obtained 2,5 - dimethyl - 3 - acetoxymercuri - 4 - methoxy - 1,6,8 - triazabicyclo[4,3,0]nonane - 7,9 - dione [III; R=H, R'=CH$_3$COO, R''=CH$_3$, Y and Y'=CH$_3$].

By replacing in the preparation just described the methanol by water, ethanol, isopropanol, butanol, ethylene glycol, 2-ethoxyethanol or diethylene glycol, and carrying out the reaction at a temperature between about 20° C. and 150° C., taking into account the boiling point of the medium, there can be obtained, respectively, 3-hydroxymercuri - 4 - hydroxy-1,6,8-triazabicyclo[4,3,0]-nonane-7,9-dione [III; R=H, R'=H, R''=H, Y and Y'=H], 3-acetoxymercuri - 4-ethoxy-1,6,8-triazabicyclo[4,3,0]nonane-7,9-dione [R'=CH$_3$COO, R''=C$_2$H$_5$], 3- acetoxymercuri - 4-isopropoxy-1,6,8-triazabicyclo[4,3,0]-nonane-7,9-dione [R″=(CH₃)₂CH], 3-acetoxymercuri-4-butoxy - 1,6,8 - triazabicyclo[4,3,0]nonane - 7,9-dione [R″=n-C₄H₉], 3 - acetoxymercuri-4-(2-hydroxyethoxy)-1,6,8-triazabicyclo[4,3,0]nonane-7,9-dione

[R″=HOCH₂CH₂]

3 - acetoxymercuri-4-(2-ethoxyethoxy)-1,6,8-triazabicyclo-[4,3,0]nonane - 7,9-dione [R″=CH₃CH₂OCH₂CH₂], 3-acetoxymercuri - 4 - [2-(2-hydroxyethoxy)ethoxy]-1,6,8-triazabicyclo[4,3,0]nonane-7,9-dione.

[R″=HOCH₂CH₂OCH₂CH₂].

3-hydroxymercuri-4-hydroxy-1,6,8-triazabicyclo[4,3,0]-nonane-7,9-dione was obtained in the form of a colorless amorphous solid, M. P. 266.5° C. (dec.) with darkening at 264° C.

*Analysis.*—Calcd. for C₆H₉HgN₃O₄: Hg, 51.7; N, 10.84. Found: Hg, 53.0; N, 10.83.

(b) *3 - hydroxymercuri - 4 - methoxy-1,6,8-triazabicyclo-[4,3,0]nonane-7,9-dione* [III; R=H, R′=HO, R″=CH₃, Y and Y′=H]

3-acetoxymercuri-4-methoxy-1,6,8-triazabicyclo[4,3,0]-nonane-7,9-dione (89 g., 0.2 mole) was dissolved in 1 liter of 0.2 N sodium hydroxide solution, and the solution was filtered to remove a small amount of insoluble material. The filtrate was cooled and carbon dioxide gas was passed in until precipitation of the product was complete. The product was collected by filtration, washed with water, absolute alcohol and ether, and dried for four hours in vacuo at 60° C., giving 46 g. of 3-hydroxymercuri-4-methoxy - 1,6,8-triazabicyclo[4,3,0]nonane-7,9-dione, M. P. 295–300° C. (dec.).

*Analysis.*—Calcd. for C₇H₁₁HgN₃O₄: Hg, 49.93; N, 10.46; O, 15.93. Found: Hg, 49.95; N, 10.78; O, 15.85.

3 - hydroxymercuri-4-methoxy-1,6,8-triazabicyclo[4,3,0] nonane-7,9-dione was found to possess diuretic activity greater than that of o-[(3-hydroxymercuri-2-methoxy-propyl)carbamyl]-phenoxyacetic acid (mersalyl free acid) when administered to dogs at dose levels of 0.5–2.0 mg./kg. of body weight. No toxic manifestations were observed at any dose level.

(c) *3 - (carboxymethylthiomercuri)-4-methoxy-1,6,8-triazabicyclo[4,3,0]nonane - 7,9 - dione* [III; R=H, R′=HOOCCH₂S, R″=CH₃, Y and Y′=H]

Thioglycolic acid (1.84 g., 0.02 mole) was dissolved in 10 ml. of water containing 0.8 g. of sodium hydroxide (0.02 mole), and added to a solution of 8.04 g. (0.02 mole) of 3-hydroxymercuri-4-methoxy-1,6,8-triazabicyclo-[4,3,0]nonane-7,9-dione and an equivalent amount of sodium hydroxide in 50 ml. of water. A small amount of insoluble material was removed by filtration, and the filtrate was diluted with 300 ml. of acetone and 200 ml. of isopropyl alcohol. The pale yellow oil which separated was obtained by decantation of the supernatant solution, and the oil was triturated with acetone to give a semisolid gum. The latter was dissolved in 20 ml. of water, the solution was diluted with 150 ml. of methanol, and a flocculent precipitate was removed by filtration. Further dilution of the filtrate with 300 ml. of isopropyl alcohol and 200 ml. of acetone caused the product to precipitate as a flocculent white powder, which was collected by filtration, dried in vacuo at 60–65° C., ground to a fine powder and further dried in vacuo at 80° C., giving 4.9 g. of 3-(carboxymethylthiomercuri)-4-methoxy-1,6,8-tri-azabicyclo-[4,3,0]nonane-7,9-dione in the form of its disodium salt, M. P. 211–223.5° C. with decomposition at 219° C.

*Analysis.*—Calcd. for C₉H₁₁HgN₃Na₂O₅S: Hg, 38.6; N, 8.08. Found: Hg, 39.0; N, 7.52.

3 - (carboxymethylthiomercuri)-4-methoxy-1,6,8-triaza-bicyclo[4,3,0]nonane-7,9-dione was found to possess diuretic activity greater than that of mercaptomerin sodium (disodium salt of N-(γ-carboxymethylmercaptomercuri-β-methoxy)propylcamphoramic acid) when administered to dogs at dose levels of 0.5–2.0 mg./kg. of body weight. No toxic manifestations were observed at any dose level.

(d) *3 - (1,2-dicarboxyethylthiomercuri)-4-methoxy-1,6,8-triazabicyclo[4,3,0]nonane-7,9-dione* [III; R=H, R′=HOOCCH₂CH(COOH)S, R″=CH₃, Y and Y′=H]

To a solution of 0.8 g. (0.02 mole) of sodium hydroxide in 50 ml. of water was added 4.44 g. (0.01 mole) of 3-acetoxymercuri - 4 - methoxy-1,6,8-triazabicyclo[4,3,0]-nonane-7,9-dione. The resulting opalescent mixture was filtered and 1.50 g. (0.01 mole) of thiomalic acid dissolved in a solution of 0.08 g. (0.02 mole) of sodium hydroxide in 10 ml. of water was combined with the filtrate. A small amount of insoluble material was removed by filtration, and the filtrate was diluted with 1 liter of acetone and cooled until the product had separated in the form of an oil. The supernatant solution was decanted and the oil was triturated repeatedly with several portions of acetone until a powdery, colorless, amorphous solid was obtained. After drying, there was obtained 3.9 g. of 3-(1,2-dicarboxyethylthiomercuri)-4-methoxy-1,6,8-triazabicyclo[4,3,0]nonane-7,9-dione in the form of its trisodium salt, M. P. 120–125° C.

(e) *3 - methylthiomercuri - 4-methoxy-1,6,8-triazabicyclo-[4,3,0]nonane-7,9-dione* [III; R=H, R′=CH₃S, R″=CH₃, Y and Y′=H]

3-acetoxymercuri-4-methoxy-1,6,8-triazabicyclo[4,3,0]-nonane-7,9-dione (4.44 g., 0.01 mole) was dissolved in 50 ml. of water containing 0.8 g. (0.02 mole) of sodium hydroxide. The resulting cloudy solution was filtered, and a solution of 0.5 g. (0.01 mole) of methyl mercaptan in 15–20 ml. of methanol was added to the filtrate. The reaction mixture was filtered, and the filtrate was diluted with 400 ml. of acetone which caused separation of a crystalline product. The product was collected by filtration and dried, giving 3.0 g. of 3-methylthiomercuri-4-methoxy-1,6,8-triazabicyclo[4,3,0]nonane-7,9-dione in the form of its sodium salt. A sample when recrystallized from methanol was obtained in the form of colorless platelets, M. P. above 210° C. with decomposition at 178.5° C.

*Analysis.*—Calcd. for C₈H₁₂HgN₃NaO₃S: Hg, 44.2; N, 9.26. Found: Hg, 43.3; N, 8.33.

3-hydroxymercuri-4-methoxy-1,6,8-triazabicyclo[4,3,0]-nonane-7,9-dione can be reacted with molar equivalent amounts of β-hydroxypropionic acid, carbethoxymethyl-mercaptan, serine, monosodium cysteinate, thiosorbitol, or thioglycerol to give, respectively, 3-(β-hydroxypropion-oxymercuri)-4-methoxy-1,6,8-triazabicyclo[4,3,0]nonane-7,9-dione [R′=HOCH₂CH₂COO]; 3-(carbethoxymethyl-thiomercuri)-4-methoxy-1,6,8-triazabicyclo[4,3,0]nonane-7,9-dione [R′=C₂H₅OOCCH₂S]; 3-(α-amino-β-hydroxy-propionoxymercuri) - 4 - methoxy - 1,6,8 - triazabicyclo-[4,3,0]nonane-7,9-dione [R′=HOCH₂CH(NH₂)COO]; 3-(2-carboxy-2-aminoethylthiomercuri)-4 - methoxy-1,6,8-triazabicyclo[4,3,0]nonane-7,9-dione

[R′=HOOCCH(NH₂)CH₂S]

3 - (2,3,4,5,6 - pentahydroxyhexylthiomercuri) - 4-methoxy-1,6,8-triazabicyclo[4,3,0]nonane-7,9-dione

[R′=HOCH₂CH(OH)CH(OH)

CH(OH)CH(OH)CH₂S]

or 3-(2,3-dihydroxypropylthiomercuri)-4-methoxy-1,6,8-triazabicyclo[4,3,0]nonane-7,9-dione

[R′=HOCH₂CH(OH)CH₂S]

3-chloromercuri-4 - methoxy-1,6,8-triazabicyclo[4,3,0]-nonane-7,9-dione [III; R=H, R′=Cl, R″=CH₃, Y and Y′=H]; 3-bromomercuri-4-methoxy-1,6,8-triazabicyclo-[4,3,0]nonane-7,9-dione [III; R′=Br]; 3-iodomercuri-4-methoxy - 1,6,8 - triazabicyclo[4,3,0]nonane - 7,9 - dione (III; R'=I); and sodium 3-hydrothiosulfatomercuri-4-methoxy-1,6,8-triazabicyclo[4,3,0]nonane-7,9-dione

[R'=NaSO₃—S]

can be prepared by treating a methanolic solution of 3-acetoxymercuri - 4 - methoxy - 1,6,8 - triazabicyclo[4,3,-0]nonane-7,9-dione with an aqueous solution of sodium chloride, sodium bromide, sodium iodide or sodium thiosulfate, respectively.

EXAMPLE 2

*8-carbethoxymethyl-1,6,8 - triazabicyclo[4,3,0]-3-nonene-7,9-dione* [I; R=CH₂COOC₂H₅, Y and Y'=H]

To a solution of 50 g. (0.326 mole) of 1,6,8-triazabicyclo[4,3,0]-3-nonene-7,9-dione in 170 ml. of 1.96 N aqueous sodium hydroxide was added a solution of 54.5 g. (0.326 mole) of ethyl bromoacetate in 150 ml. of 95% alcohol. The reaction mixture was refluxed for fifteen hours, the alcohol was removed by warming the mixture in vacuo, and the resulting water-oil mixture was chilled to crystallize the oil. The solid product was collected by filtration and recrystallized from 350 ml. of hot water, using activated charcoal for decolorizing purposes, giving 54.5 g. of colorless needles, M. P. 99–103° C. The latter material was heated with 400 ml. of benzene, the solution filtered to remove 1.7 g. of insoluble material, and the solution concentrated to dryness in vacuo. The residue was recrystallized from 500 ml. of water to give 43 g. of 8-carbethoxymethyl-1,6,8-triazabicyclo[4,3,0] - 3 - nonene-7,9-dione, M. P. 102.5–105° C.

*Analysis.*—Calcd. for C₁₀H₁₃N₃O₄: C, 50.31; H, 5.43. Found: C, 50.49; H, 5.49.

The utility of 8-carbethoxymethyl-1,6,8-triazabicyclo-[4,3,0]-3-nonene-7,9-dione as an intermediate is illustrated by the following preparation:

*3 - acetoxymercuri - 4-methoxy-8-carbethoxymethyl-1,6,8-triazabicyclo[4,3,0]nonane - 7,9, - dione* [III; R= CH₂COOC₂H₅, R'=CH₃COO, R"=CH₃, Y and Y' =H]

To a solution of 5.0 g. (0.021 mole) of 8-carbethoxymethyl-1,6,8-triazabicyclo[4,3,0]-3-nonene - 7,9 - dione in 100 ml. of methanol was added all at once a solution of 6.65 g. (0.021 mole) of mercuric acetate in 75 ml. of methanol. Two drops of concentrated nitric acid was then added, and the solution was refluxed for twenty minutes. The reaction mixture was concentrated to dryness in vacuo at below 50° C., the solid residue was dissolved in 35 ml. of hot methanol, and the solution was filtered and cooled. (In some runs the resulting polymorphic product separated as needles which transformed slowly to plates, while in other runs the product precipitated directly as plates.) The product was collected by filtration, giving 6.6 g. of 3-acetoxymercuri-4-methoxy-8-carbethoxymethyl-1,6,8-triazabicyclo[4,3,0]nonane-7,9-dione, M. P. 181–183.5° C. with softening at about 110–115° C.; it melted immediately when immersed at 140° C.

*Analysis.*—Calcd. for C₁₃H₁₉HgN₃O₇: Hg., 37.86; N, 7.93. Found: Hg, 37.85; N, 7.89.

3-acetoxymercuri-4-methoxy-8-carbethoxymethyl-1,6,8-triazabicyclo[4,3,0]nonane-7,9-dione was found to possess diuretic activity greater than that of mersalyl free acid when administered to dogs at dose levels of 0.5–2.0 mg./kg. of body weight.

EXAMPLE 3

*8-carboxymethyl-1,6,8-triazabicyclo[4,3,0]-3-nonene-7,9-dione* [I; R=CH₂COOH, Y and Y'=H]

A mixture of 25.0 g. (0.105 mole) of 8-carbethoxymethyl-1,6,8-triazabicyclo[4,3,0]-3-nonene-7,9-dione (prepared as described above in Example 2) and 100 ml. of 2 N aqueous hydrochloric acid was heated on a steam bath with frequent stirring until it became homogeneous (about five minutes) and then heated for an additional thirty minutes at 90–95° C. The reaction mixture was cooled and the resulting solid which separated (14.5 g.) was collected by filtration. Evaporation of the filtrate to a 20 ml. volume afforded an additional 5 g. The total material was recrystallized from 50 ml. of water to give 17.8 g. of 8-carboxymethyl-1,6,8-triazabicyclo[4,3,0]-3-nonene-7,9-dione in the form of colorless, massive prisms, M. P. 160–169° C.

*Analysis.*—Calcd. for C₈H₉N₃O₄: N, 19.90. Found: N, 19.92.

Neut. equiv. calcd.: 211. Found: 211.

8 - carboxymethyl - 1,6,8 - triazabicyclo[4,3,0] - 3-nonene-7,9-dione was found to possess diuretic activity equal to or greater than that of theophylline when administered to dogs at dose levels of 7.5–30.0 mg./kg. of body weight. No toxic manifestations were observed at any of the dose levels.

The utility of 8-carboxymethyl-1,6,8-triazabicyclo-[4,3,0]-3-nonene-7,9-dione as an intermediate is illustrated by the following preparations:

(a) *4-acetoxymercuri-5-methoxy-8-carboxymethyl-1,6,8-triazabicyclo[4,3,0]nonane - 7,9 - dione* [III; R =CH₂COOH, R'=CH₃COO, R"=CH₃, Y and Y'=H]

To a solution of 7.15 g. (0.034 mole) of 8-carboxymethyl-1,6,8-triazabicyclo[4,3,0]-3-nonene-7,9-dione and 7.15 g. of potassium acetate in 200 ml. of methanol was added seven drops of concentrated nitric acid followed by a warm solution of 10.8 g. (0.034 mole) of mercuric acetate in 100 ml. of methanol. The resulting clear solution was refluxed for three hours and the solvent was then removed in vacuo at below 50° C. The residue was dissolved in 25 ml. of water, the solution was filtered, and the filtrate allowed to stand at room temperature for about fifteen hours. The solid material which separated was collected by filtration, triturated with water, washed twice with methanol and dried for sixteen hours at 25° C. in vacuo (10 mm.), giving 11.2 g. of 4-acetoxymercuri-5-methoxy-8-carboxymethyl-1,6,8 - triazabicyclo-[4,3,0]nonane-7,9-dione, M. P. 232–235° C. (dec.).

In the preparation just described the potassium acetate was added in order to prevent the formation of an insoluble complex between the 8-carboxymethyl-1,6,8-triazabicyclo[4,3,0]-3-nonene-7,9-dione and the mercuric acetate, probably involving the free carboxy group.

(b) *4-hydroxymercuri-5-methoxy-8-carboxymethyl-1,6,8-triazabicyclo - [4,3,0]nonane - 7,9 - dione* [III; R =CH₂COOH, R'=HO, R"=CH₃, Y and Y'=H]

To 11.0 g. of 4-acetoxymercuri-5-methoxy-8-carboxymethyl-1,6,8-triazabicyclo[4,3,0]nonane-7,9 - dione suspended in 50 ml. of water was added a solution of 22.4 ml. of 1.96 N sodium hydroxide in 150 ml. of water. The mixture was filtered and concentrated in vacuo at a temperature below 50° C. to a volume of 30 ml. Methanol (250 ml.) was added and the solid material which separated, largely sodium acetate, was removed by filtration. The filtrate was concentrated in vacuo, the residue was taken up in water and the insoluble material was removed by filtration. The filtrate was again concentrated and the residue was recrystallized from 250 ml. of methanol, giving 2.6 g. of 4-hydroxymercuri-5 - methoxy - 8 - carboxymethyl - 1,6,8 - triazabicyclo-[4,3,0]nonane-7,9-dione in the form of its sodium salt, M. P. above 225° C. (dec.) with softening at 205.5° C.

*Analysis.*—Calcd. for C₉H₁₂HgN₃NaO₆: Hg, 41.6; N, 8.72. Found: Hg, 42.6; N, 9.18.

EXAMPLE 4

*8 - methyl - 1,6,8 - triazabicyclo[4,3,0] - 3 - nonene - 7,9-dione* [I; R=CH₃, Y and Y'=H]

To a solution of 21.75 g. (0.142 mole) of 1,6,8-triazabicyclo[4,3,0]-3-nonene-7,9-dione in 76.5 ml. of 1.96 N aqueous sodium hydroxide (0.15 mole) at 25°

C. was added 17.9 g. (0.142 mole) of dimethyl sulfate dropwise with stirring over a period of fifteen minutes. The solution was then heated at 95° C. for one and one-quarter hours and cooled. The solid material which separated (17.7 g.) was collected by filtration, giving 15.3 g. of 8-methyl-1,6,8-triazabicyclo[4,3,0]-3-nonene-7,9-dione in the form of heavy needles, M. P. 153–159° C. A sample when recrystallized again from water and then from methanol had the M. P. 155–159° C.

The utility of 8-methyl-1,6,8-triazabicyclo[4,3,0]-3-nonene-7,9-dione as an intermediate is illustrated by the following preparation:

*3 - acetoxymercuri - 4 - methoxy - 8 - methyl - 1,6,8 - triazabicyclo[4,3,0]-nonane-7,9 - dione* [III; R=CH₃, R'=CH₃COO, R''=CH₃, Y and Y'=H]

To a solution of 6.0 g. (0.036 mole) of 8-methyl-1,6,8-triazabicyclo[4,3,0]-3-nonene-7,9-dione in 60 ml. of warm methanol was added a solution of 11.45 g. (0.036 mole) of mercuric acetate in 75 ml. of hot methanol. Six drops of concentrated nitric acid was then added, and the solution was refluxed for fifteen minutes. The reaction mixture was concentrated to a volume of 90 ml., and the solid material which separated upon cooling was collected by filtration, giving 14.3 g. of 3-acetoxymercuri - 4 - methoxy - 8 - methyl - 1,6,8 - triazabicyclo[4,3,0] - nonane-7,9 - dione, which when recrystallized from 100 ml. of methanol had the M. P. 188–191° C. (dec.).

*Analysis.*—Calcd. for C₁₀H₁₅HgN₃O₅: Hg, 43.8; N, 9.18. Found: Hg, 43.6; N, 9.24.

3 - acetoxymercuri - 4 - methoxy - 8 - methyl - 1,6,8 - triazabicyclo[4,3,0]nonane-7,9-dione was found to possess diuretic activity greater than that of mersalyl free acid when administered to dogs at dose levels of 0.5–2.0 mg./kg. of body weight. No toxic manifestations were observed at any of the dose levels.

EXAMPLE 5

*8 - (2 - hydroxyethyl) - 1,6,8 - triazabicyclo[4,3,0] - 3 - nonene-7,9-dione* [I; R=CH₂CH₂OH, Y and Y'=H]

A solution of 10.0 g. (0.065 mole) of 1,6,8-triazabicyclo[4,3,0]-3-nonene-7,9-dione in 34 ml. of 2 N aqueous sodium hydroxide was concentrated to dryness on a steam bath in vacuo. Ethylene bromohydrin (25 g.) was then added, and the mixture was refluxed for one and one-half hours. The reaction mixture was cooled, diluted with some alcohol and ether, and the solid material which separated was collected by filtration and recrystallized from water to give 5.7 g. of 8-(2-hydroxyethyl) - 1,6,8 - triazabicyclo[4,3,0] - 3 - nonene - 7,9 - dione, M. P. 158–165° C. A sample when recrystallized first from dilute sodium hydroxide and then from water was obtained in the form of colorless, massive prisms, M. P. 162–167.5° C.

*Analysis.*—Calcd. for C₈H₁₁N₃O₃: N, 21.31; O, 24.34. Found: N, 21.54; O, 24.50.

The utility of 8-(2-hydroxyethyl)-1,6,8-triazabicyclo[4,3,0]-3-nonene-7,9-dione as an intermediate is illustrated by the following preparation:

*3 - acetoxymercuri - 4 - methoxy - 8 - (2 - hydroxyethyl) - 1,6,8 - triazabicyclo[4,3,0]nonane - 7,9 - dione* [III; R=CH₂CH₂OH, R'=CH₃COO, R''=CH₃, Y and Y'=H]

can be prepared by reacting 8-(2-hydroxyethyl)-1,6,8-triazabicyclo[4,3,0]-3-nonene-7,9 - dione with mercuric acetate in methanol solution according to the mercuration procedure described above following Example 4.

EXAMPLE 6

*8 - dodecyl - 1,6,8 - triazabicyclo[4,3,0] - 3 - nonene-7,9-dione* [I; R=C₁₂H₂₅, Y and Y'=H]

A solution of 19.2 g. (0.126 mole) of 1,6,8-triazabicyclo[4,3,0]-3-nonene-7,9-dione in 70 ml. of 2 N aqueous sodium hydroxide was concentrated to dryness on a steam bath in vacuo. The residue was dissolved in 60 ml. of dimethylformamide with warming, 40 g. (0.016 mole) of dodecyl bromide was added, and the reaction mixture was refluxed for three hours. The mixture was then cooled, 100 ml. of water was added, and the mixture was stirred until the oily layer had solidified. The solid material was collected by filtration and dissolved in 100 ml. of methanol. Water was added to the solution at 60° C. to the point of turbidity and the solution allowed to cool. The solid material which separated (18.2 g.) was recrystallized from 40 ml. of methanol, giving 15.6 g. of 8-dodecyl-1,6,8-triazabicyclo[4,3,0]-3-nonene-7,9-dione in the form of needles, M. P. 42–47° C. A sample when recrystallized again from methanol had the M. P. 44.5–45.5° C.

*Analysis.*—Calcd. for C₁₈H₃₁N₃O₂: N, 13.07; O, 9.95; C, 67.24; H, 9.72. Found: N, 12.90; O, 10.08; C, 67.68; H, 9.68.

The utility of 8-dodecyl-1,6,8-triazabicyclo[4,3,0]-3-nonene-7,9-dione as an intermediate is illustrated by the following:

*3 - acetoxymercuri - 4 - methoxy - 8-dodecyl-1,6,8-triazabicyclo[4,3,0]nonane - 7,9 - dione* [III; R=C₁₂H₂₅, R'=CH₃COO, R''=CH₃, Y and Y'=H]

can be prepared by reacting 8-dodecyl-1,6,8-triazabicyclo[4,3,0] - 3 - nonene - 7,9 - dione with mercuric acetate in methanol solution according to the mercuration procedure described above following Example 4.

EXAMPLE 7

*8-(p-nitrobenzyl)-1,6,8 - triazabicyclo[4,3,0] - 3 - nonene-7,9-dione* [I; R=CH₂C₆H₄NO₂-p, Y and Y'=H]

To a solution of 20 g. (0.013 mole) of 1,6,8-triazabicyclo[4,3,0]-3-nonene-7,9-dione in 65 ml. of 2 N aqueous sodium hydroxide was added 100 ml. of ethanol and 22.4 g. of p-nitrobenzyl chloride. The reaction mixture was refluxed for five hours, cooled, and the solid material which separated was collected by filtration and recrystallized from 400 ml. of ethyl acetate, using activated charcoal for decolorizing purposes. There was thus obtained 22.7 g. of 8-(p-nitrobenzyl)-1,6,8-triazabicyclo[4,3,0]-3-nonene-7,9-dione in the form of colorless needles, M. P. 200–202.5° C.

*Analysis.*—Calcd. for C₁₃H₁₂N₄O₄: N, 19.43; O, 22.20. Found: N, 19.53; O, 21.80.

The utility of 8-(p-nitrobenzyl)-1,6,8-triazabicyclo[4,3,0]-3-nonene-7,9-dione as an intermediate is illustrated by the following:

*3-acetoxymercuri-4-methoxy-8-(p - nitrobenzyl)-1,6,8-triazabicyclo[4,3,0]nonane-7,9-dione*

[III; R=CH₂C₆H₄NO₂-p
R'=CH₃COO, R''=CH₃, Y and Y'=H]

can be prepared by reacting 8-(p-nitrobenzyl)-1,6,8-triazabicyclo[4,3,0]-3-nonene-7,9-dione with mercuric acetate in methanol solution according to the mercuration procedure described above following Example 4.

8-cyclohexyl - 1,6,8-triazabicyclo[4,3,0]-3-nonene-7,9-dione [I; R=C₆H₁₁, Y and Y'=H] can be prepared by reacting 1,6,8-triazabicyclo[4,3,0]-3-nonene-7,9-dione in sodium hydroxide solution with a molar equivalent amount of cyclohexyl bromide according to the manipulative described above in Example 5. 3-acetoxymercuri-4-methoxy-8-cyclohexyl - 1,6,8-triazabicyclo[4,3,0]nonane-7,9-dione [III; R=C₆H₁₁, R'=CH₃COO, R''=CH₃, Y and Y'=H] can be prepared by reacting 8-cyclohexyl-1,6,8-triazabicyclo[4,3,0]-3-nonene-7,9-dione with mercuric acetate in methanol solution according to the mercuration procedure described above following Example 4.

8-(2,3,4-trihydroxybutyl) - 1,6,8 - triazabicyclo[4,3,0]-3-nonene-7,9-dione [I;

R=CH₂CH(OH)CH(OH)CH₂OH,

Y and Y'=H] can be prepared by reacting 1,6,8-triazabicyclo[4,3,0]-3-nonene-7-9-dione in sodium hydroxide solution with 2,3,4-trihydroxybutyl chloride according to the manipulative procedure described above in Example 5. 3-acetoxymercuri - 4 - methoxy - 8-(2,3,4-trihydroxybutyl)-1,6,8 - triazabicyclo[4,3,0]nonane - 7,9-dione [III; R=CH₂CH(OH)CH(OH)CH₂OH, R'=CH₃COO, R''=CH₃, Y and Y'=H]

can be prepared by reacting 8-(2,3,4-trihydroxybutyl)-1,6,8-triazabicyclo[4,3,0]-3-nonene-7,9-dione with mercuric acetate in methanol solution according to the mercuration procedure described above following Example 4.

I claim:

1. An 8-R-1,6,8-triazabicyclo[4,3,0] - 3 - nonene - 7,9-dione, having the formula

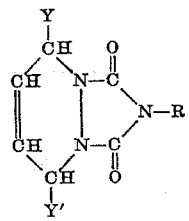

wherein R is a member of the group consisting of hydrogen, an alkali metal and the non-toxic organic portion of an alkylating agent having a molecular weight less than about 300 and Y and Y' are members of the group consisting of hydrogen and lower-alkyl groups.

2. An 8-R-1,6,8-triazabicyclo[4,3,0] - 3 - nonene - 7,9-dione, wherein R is an alkali metal having the formula

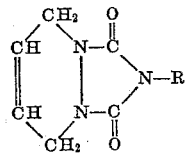

3. An 8-R-1,6,8-triazabicyclo[4,3,0] - 3 - nonene - 7,9-dione, wherein R is the residue of an alkylating agent having a molecular weight less than about 300 having the formula

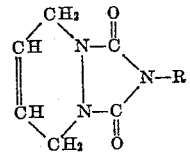

4. 1,6,8-triazabicyclo[4,3,0]-3-nonene-7,9-dione.

5. An 8-alkyl-1,6,8-triazabicyclo[4,3,0]-3-nonene-7,9-dione having the formula

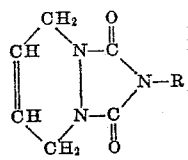

wherein R is an alkyl group.

6. An 8-carboxy-lower-alkyl-1,6,8-triazabicyclo[4,3,0]-3-nonene-7,9-dione having the formula

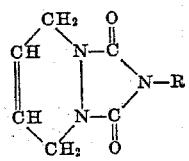

wherein R is a carboxy-lower-alkyl group.

7. An 8-carbo-lower-alkoxy-lower-alkyl-1,6,8-triazabicyclo[4,3,0]-3-nonene-7,9-dione having the formula

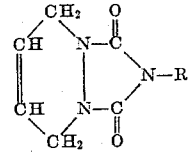

wherein R is a carbo-lower-alkoxy-lower-alkyl group.

8. 8-methyl - 1,6,8 - triazabicyclo[4,3,0]-3-nonene-7,9-dione.

9. 8-dodecyl-1,6,8 - triazabicyclo[4,3,0]-3-nonene-7,9-dione.

10. 8 - carboxymethyl - 1,6,8 - triazabicyclo[4,3,0] - 3-nonene-7,9-dione.

11. 8-carbethoxymethyl-1,6,8 - triazabicyclo[4,3,0]-3-nonene-7,9-dione.

12. A process for preparing a 1,6,8-triazabicyclo[4,3,0]-3-nonene-7,9-dione, having the formula

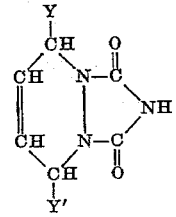

wherein Y and Y' are members of the group consisting of hydrogen and lower-alkyl groups, which comprises pyrolyzing a 1,2-dicarbamyl-1,2,3,6-tetrahydropyridazine having the formula

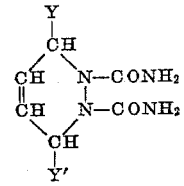

13. A process for preparing an 8-R-1,6,8-triazabicyclo[4,3,0]-3-nonene-7,9-dione, having the formula

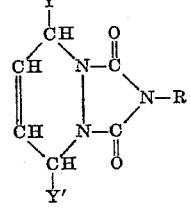

wherein R is the non-toxic organic portion of an alkylating agent having a molecular weight less than about 300, and Y and Y' are members of the group consisting of hydrogen and lower-alkyl groups, which comprises reacting an alkali metal salt of a 1,6,8-triazabicyclo[4,3,0] 3-nonene-7,9-dione having the formula

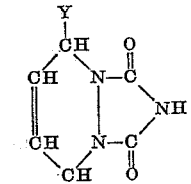

with an alkylating agent RX, wherein X is the anion of a strong acid.

14. A process for preparing 1,6,8-triazabicyclo[4,3,0] 3-nonene-7,9-dione, which comprises pyrolyzing 1,2-dicarbamyl-1,2,3,6-tetrahydropyridazine.

15. A process for preparing an 8-alkyl-1,6,8-triazabicyclo[4,3,0]-3-nonene-7,9-dione having the formula

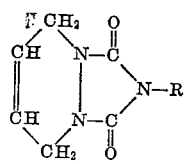

wherein R is an alkyl group, which comprises reacting an alkali metal salt of 1,6,8-triazabicyclo[4,3,0]-3-nonene-7,9-dione with an alkylating agent RX, wherein X is the anion of a strong acid.

16. A process for preparing an 8-carboxy-lower-alkyl-1,6,8-triazabicyclo[4,3,0]-3-nonene-7,9-dione having the formula

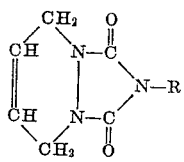

wherein R is a carboxy-lower-alkyl group, which comprises reacting an alkali metal salt of 1,6,8-triazabicyclo [4,3,0] - 3 - nonene - 7,9 - dione with an alkylating agent RX, wherein X is the anion of a strong acid.

17. A process for preparing an 8-carbo-lower-alkoxy-lower-alkyl - 1,6,8-triazabicyclo[4,3,0]-3-nonene-7,9-dione having the formula

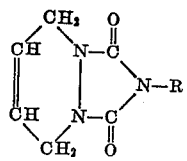

wherein R is a carbo-lower-alkoxy-lower-alkyl group, which comprises reacting an alkali metal salt of 1,6,8-triazabicyclo[4,3,0]-3-nonene-7,9-dione with an alkylating agent RX, wherein X is the anion of a strong acid.

18. A process for preparing 8-methyl-1,6,8-triazabicyclo[4,3,0]-3-nonene-7,9-dione, which comprises reacting the sodium salt of 1,6,8-triazabicyclo[4,3,0]-3-nonene-7,9-dione with dimethyl sulfate.

19. A process for preparing 8-dodecyl-1,6,8-triazabicyclo[4,3,0]-3-nonene-7,9-dione, which comprises reacting the sodium salt of 1,6,8-triazabicyclo[4,3,0]-3-nonene-7,9-dione with dodecyl bromide.

20. A process for preparing 8-carbethoxymethyl-1,6,8-triazabicyclo[4,3,0]-3-nonene-7,9-dione, which comprises reacting the sodium salt of 1,6,8-triazabicyclo[4,3,0]-3-nonene-7,9-dione with ethyl bromoacetate.

References Cited in the file of this patent

MacKenzie et al.: J. Org. Chem. 17, 1666–1674 (1952).

Elderfield: Heterocyclic Compounds, vol. 3, page 290 (1952 edition).